(12) United States Patent
Sheahan, Jr. et al.

(10) Patent No.: US 8,567,714 B2
(45) Date of Patent: Oct. 29, 2013

(54) FLIGHT CONTROL USING ACTUATED VARIABLE MOMENT ARM

(75) Inventors: James J. Sheahan, Jr., Florissant, MO (US); Charles E. Morris, Des Peres, MO (US); Jeffrey M. Roach, St. Charles, MO (US); Howard Carter, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 547 days.

(21) Appl. No.: 11/952,317

(22) Filed: Dec. 7, 2007

(65) Prior Publication Data

US 2009/0146013 A1      Jun. 11, 2009

(51) Int. Cl.
*B64C 5/10* (2006.01)
(52) U.S. Cl.
USPC ............... 244/90 R; 244/99.14; 244/213
(58) Field of Classification Search
USPC .......... 244/99.14, 99.7, 76 A, 87, 90 R, 90 A, 244/91, 211–217
See application file for complete search history.

(56) References Cited

U.S. PATENT DOCUMENTS

| | | | |
|---|---|---|---|
| 3,965,798 A * | 6/1976 | Estlick | ............................ 91/172 |
| 4,595,158 A * | 6/1986 | Robinson | .................. 244/99.14 |
| 6,567,729 B2 | 5/2003 | Betters et al. | |
| 6,732,027 B2 | 5/2004 | Betters et al. | |
| 6,732,974 B1 * | 5/2004 | Lewis et al. | ................. 244/35 A |

\* cited by examiner

*Primary Examiner* — Timothy D Collins
*Assistant Examiner* — Brian M O'Hara
(74) *Attorney, Agent, or Firm* — Parsons Behle & Latimer

(57) ABSTRACT

Systems and techniques are described for actuating a control surface about a pivot point using variable moments. A bracket having a moment arm is coupled to the pivot point such that the bracket is rotatable about the pivot point to actuate the surface. A power actuator has a shaft coupled to the bracket at a coupling point on the moment arm such that actuation force applied to the shaft results in a moment produced about the pivot point. A linear actuator is configured to adjust the location of the coupling point with respect to the pivot point to thereby changing the moment arm and the moment produced about the pivot point as the bracket rotates. By adjusting the distance between the pivot point and the coupling point, the moments produced about the pivot point can be increased while conserving actuator power.

20 Claims, 6 Drawing Sheets

FLIGHT CONTROL USING ACTUATED VARIABLE MOMENT ARM

TECHNICAL FIELD

The embodiments described herein generally relate to flight controls for aircraft. More particularly, the embodiments described herein relate to flight controls that incorporate actuated arms to produce variable moments.

BACKGROUND

Conventional aircraft are guided by various flight control surfaces such as rudders, ailerons, flaps, elevators, stabilizers and/or the like. These flight controls are typically moveable on the exterior surface of the aircraft to affect the flow of air in accordance with the principles of aerodynamics, and are widely deployed in various types of manned or unmanned aircraft (including both fixed and rotary-wing aircraft), as well as various missiles, rockets and/or the like.

More recently, aircraft have been designed to be larger and more complex in various ways. The migration to so-called "flying wing" and other tailless aircraft designs, for example, represents a choice to design aircraft with improved performance, but potentially with less aerodynamic stability. The stability of such aircraft is typically recouped through the use of larger control surfaces and/or faster control rates. Such designs, however, can be somewhat disadvantageous in that the larger surfaces frequently undergo larger aerodynamic loads than comparatively smaller surfaces, thereby demanding additional power to overcome such loads. Faster control rates similarly impose increased power demands. The increased demands for electrical and/or hydraulic power can limit the effective range or performance of the aircraft, and/or can reduce the size of the aircraft payload. Improved power consumption and/or hydraulic power plant size would therefore improve the range, performance and/or payload capacity of the aircraft. As a result, it is desirable to produce control surfaces that conserve electric and/or hydraulic power, or at least use as little power as possible.

BRIEF SUMMARY

Various embodiments provide a system for actuating a control surface of a vehicle about a pivot point. A bracket having a bellcrank is coupled to the pivot point such that the bracket is rotatable about the pivot point to actuate the surface. A power actuator has a shaft coupled to the bracket at a coupling point on the moment arm such that actuation force applied to the shaft results in a moment produced about the pivot point. For this embodiment, a linear actuator is configured to adjust the location of the coupling point with respect to the pivot point to thereby change the length of the moment arm and subsequently the moment produced about the pivot point as the bracket rotates. By verifying the distance between the pivot point and the coupling point while the surface is in motion, the moments produced about the pivot point can be increased or decreased as desired to counteract increasing or decreasing loads applied by aerodynamic effects occurring along the flight control surface.

Other embodiments provide a method of actuating a surface that moves about a pivot point from a neutral position. A force is applied to a bracket that is coupled to the surface to thereby rotate the bracket with respect to the pivot point, wherein the force is applied at a coupling point on the bracket. While the surface is moving away from the neutral position, the distance between the coupling point and the pivot point is increased to thereby increase the moment produced about the pivot point by the force. In a further embodiment, the distance between the coupling point and the pivot point can be reduced as the surface returns to the neutral position to thereby reduce the moment produced about the pivot point by the force.

In still other embodiments, a flight control system for moving a surface on the exterior of an aircraft with respect to a neutral position is provided. A bracket having a bellcrank is coupled to the surface such that the bracket rotates with respect to a pivot point to thereby move the surface. A power actuator having a shaft is coupled to the bracket at a coupling point on the moment arm such that actuation force applied to the shaft results in a moment produced about the pivot point. A linear actuator is configured to adjust the location of the coupling point with respect to the pivot point to thereby change the moment produced about the pivot point as the bracket rotates. A digital controller is electronically coupled to drive the linear actuator, wherein the digital controller is configured to increase the distance between the pivot point and the coupling point as the surface moves away from the neutral position and to decrease the distance between the pivot point and the coupling point as the surface moves toward the neutral position.

Other embodiments, as well as various other features and aspects of various embodiments, are described in increasing detail below.

BRIEF DESCRIPTION OF THE DRAWINGS

Various embodiments will hereinafter be described in conjunction with the following drawing figures, wherein like numerals denote like elements.

FIG. 1A is a top view of an exemplary aircraft and associated control surfaces.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Power consumption can be greatly reduced by operating one or more control surfaces on the vehicle in a manner that produces variable moments about a pivot point. As a control surface deflects from its neutral position, for example, aerodynamic loads imposed by drag and/or forces acting upon the surface typically increase, which would conventionally require additional force to overcome. Through clever application of mechanical linkages, an actuation system that produces stronger moments as the surface moves can be designed such that the stronger moments are able to reduce the increased aerodynamic effects with little or no additional applied power.

As used herein, the term "coupled" as used in the context of a mechanical coupling is intended to convey either a direct or indirect connection that may or may not have intervening members. That is, two elements that are "coupled" together may be directly connected to each other or may be otherwise joined with respect to each other, with or without one or more optional intervening members (e.g. brackets, fasteners, support structures and/or the like) being present therebetween.

Figure 1:
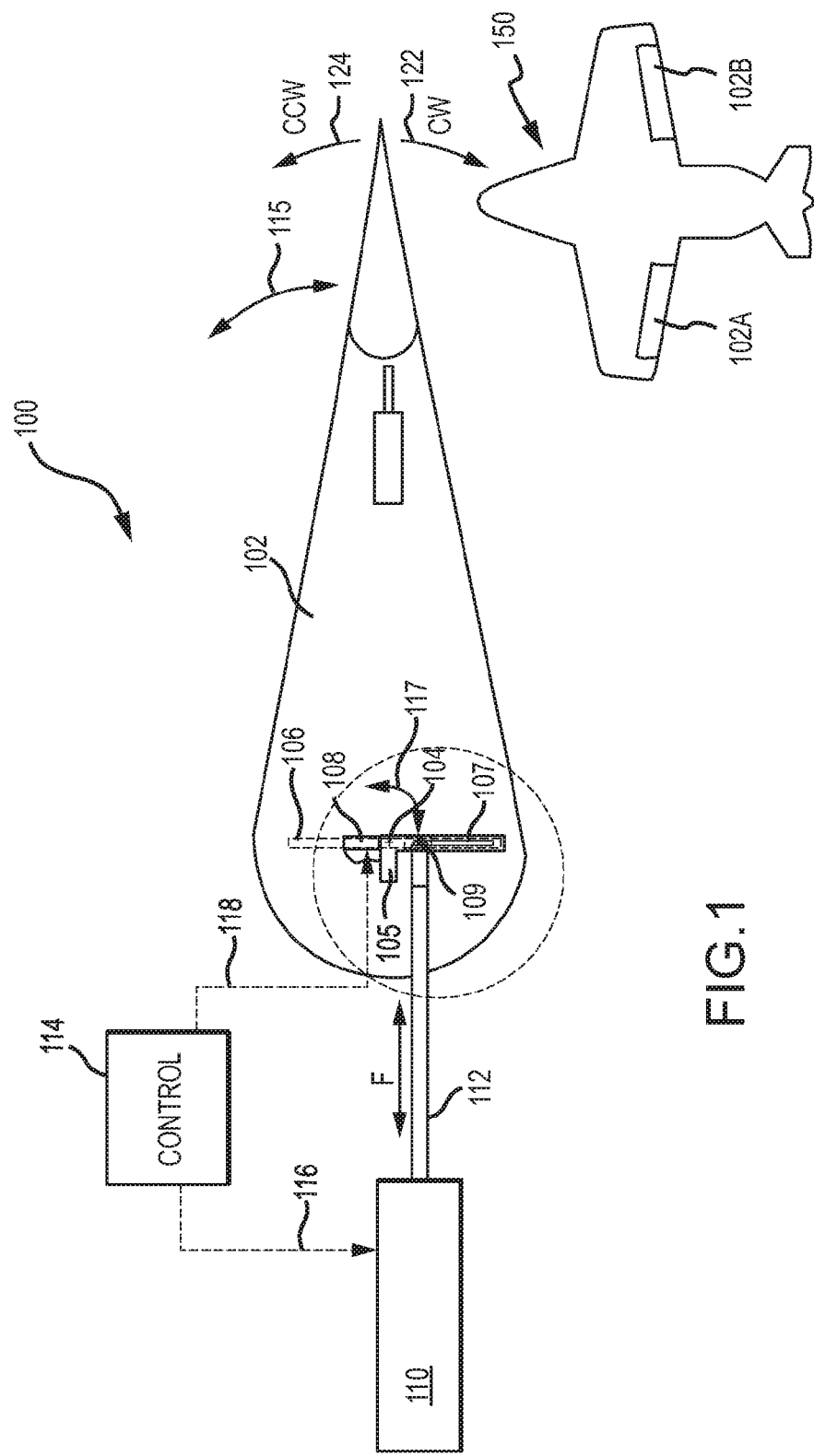
FIG. 1 is a block-level view of an exemplary flight control system.

With reference now to FIG. 1, an exemplary control system 100 for actuating a control surface 102 of an aircraft or other vehicle suitably includes a power actuator 110 that applies force (F) to a bracket 105 to produce movement of surface 102. System 100 also contains a linear actuator 108 that is able to adjust the coupling point 109 such that the torque/moment produced by force (F) about a pivot point 104 is adjustable as bracket 105 rotates about the pivot point 104. By adjusting the location of the coupling point along a moment arm of bracket 105, the moment produced about pivot point 104 can be increased in response to increased loads 115 applied by aerodynamic forces and/or other effects. In a further embodiment, a controller 114 can be provided to control and/or coordinate the application of force (F) and/or the actuation of linear actuator 108 in response to control signals 116 and/or 118, respectively.

Control surface 102 is any moveable surface located on an aircraft 150 or other vehicle that is capable of producing different aerodynamic effects at different points of deflection. In various embodiments, control surface 102 is an aircraft rudder, aileron, flap, elevator, stabilizer, elevon, flaperon, slat, tab and/or the like. In FIG. 1A, for example, control surfaces 102A-B represent flaps, ailerons and/or flaperons of a conventional aircraft 150. In an equivalent embodiment, control surface 102 may be any displaceable surface of ship or other aquatic vehicle, such as any sort of rudder or other surface, or any other surface capable of guiding a vehicle in response to movement of air, water or another fluid. In the embodiment shown in FIG. 1, control surface 102 is shown in an initial position having a relatively horizontal orientation that may reflect a "zero deflection" or other neutral state in some embodiments. Deflection from this state could occur in either a clockwise or a counter-clockwise direction. Control surface 102 may be free to move, rotate and/or deflect in either direction in certain embodiments, or may be limited to move, rotate and/or deflect in one direction or the other in other embodiments. In the embodiment shown in FIG. 1, control surface 102 is free to rotate about a pivot point 104 in either a clockwise (CW) 122 or a counter-clockwise (CCW) 124 direction in response to force (F) applied by power actuator 110.

Power actuator 110 is any sort of device capable of applying force (F) to deflect control surface 102. In various embodiments, power actuator 110 is a conventional hydraulic, electro-hydraulic, mechanical or other actuator; such devices are commonly deployed in many types of aircraft and other products. Generally speaking, power actuator 110 is able to apply a mechanical force (F) in one or more directions in response to control signals 116 received from any control source 114. Such force (f) may be applied along a shaft 112 or other member as appropriate.

Actuator 110 is coupled to control surface 102 via any sort of mechanical linkage. In various embodiments, bracket 105 connects to shaft 112 of actuator 110, and also connects to a shaft, rod or other linkage 106. Linkage 106 is integrally formed or otherwise rigidly fixed with respect to control surface 102 such that movement of bracket 105 produces corresponding deflection in control surface 102. Again, any sort of mechanical linkage between actuator 110 and control surface 102 could be designed in a wide array of equivalent embodiments, including any arrangement with additional inter-connecting members formed at any point(s) between actuator 110, shaft 112, bracket 105, linkage 106 and/or control surface 102 as appropriate.

In various embodiments, one or more brackets 105 are provided to apply mechanical force (F) supplied by power actuator 110 to deflect control surface 102 as desired. As drawn in FIG. 1, force F applied toward actuator 110 would result in clockwise movement 122 of surface 102, with force F applied away from actuator 110 resulting in counter-clockwise movement 124. Other embodiments could be formulated with any mechanical arrangement allowing movement in any direction in response to any applied force or forces. Bracket 105 is shaped in any suitable manner. In the exemplary embodiment shown in FIG. 1, bracket 105 is formed as a bell crank or similar structure that converts a linearly-applied force (F) to rotational movement about a pivot point 104. Bracket 105 may contain any sort of moment arm or other structure couples with shaft 112 at a coupling point 109 to provide a suitable moment 117 about pivot point 104, as described more fully below. Bracket 105 may also contain a slot 107 or other structure that guides movement of coupling point 109 relative to pivot point 104, thereby adjusting the torque/moment applied about pivot point 104 by force (F) applied by shaft 112.

The relative positions of coupling point 109 and pivot point 104 may be adjusted in any manner. In various embodiments, a linear actuator 108 is provided to linearly displace the coupling point 109 of shaft 112 along the moment arm of bracket 105. Linear actuator 108 is any electrical, electromechanical, hydraulic and/or other device. In various embodiments, linear actuator 108 is a digital linear motor actuator (DLMA) or similar device capable of extending or retracting a linear shaft in response to applied control signals 118. Various DLMAs and similar devices are commercially available, and many of these devices are able to extend or retract an actuator shaft in response to digital pulses and/or other control signals 118 received from an external controller 114 as appropriate.

Controller 114 is any device capable of directing the operation of power actuator 110 and/or linear actuator 108 to adjust the position of control surface 102. In various embodiments, controller 114 is a conventional digital control device such as any sort of microprocessor, microcontroller, programmed array and/or the like embedded in any sort of discrete and/or integrated hardware logic. Such hardware may execute various features and commands under the direction of software or firmware instructions, which may be stored in any sort of digital memory (e.g. any sort of read-only, random-access, flash or other memory) or the like. In various embodiments, controller 114 implements any sort of conventional feedback or control system that drives and/or coordinates the operation of actuators 108 and/or 110 as appropriate. For example, any sort of control signals 116, 118 may be produced by controller 114 and provided power actuator 110 and linear actuator 108 (respectively) as appropriate. Such control signals 116, 118 can be produced to control and/or coordinate the application of force (F) and/or the actuation of linear actuator 108 in any manner.

In operation, then, power actuator 110 applies a force (F) along shaft 112 that is converted into actuation of control surface 102 through mechanical interaction of shaft 112, bracket 105, linkage 106 and/or other features as appropriate. As the control surface 102 deflects from its neutral position, however, increasing wind resistance, drag and/or other aerodynamic effects can produce increasingly large moments 115 that oppose further actuation of the control surface. To overcome these increasingly large moments 115, then, the moment 117 produced by force (F) applied by power actuator 110 can be increased without increasing the magnitude of the force itself by increasing the distance between coupling point 109 and pivot point 105 on bracket 105. Additional detail about exemplary structures and techniques for accomplishing this change in moments is provided below.

Figure 2:
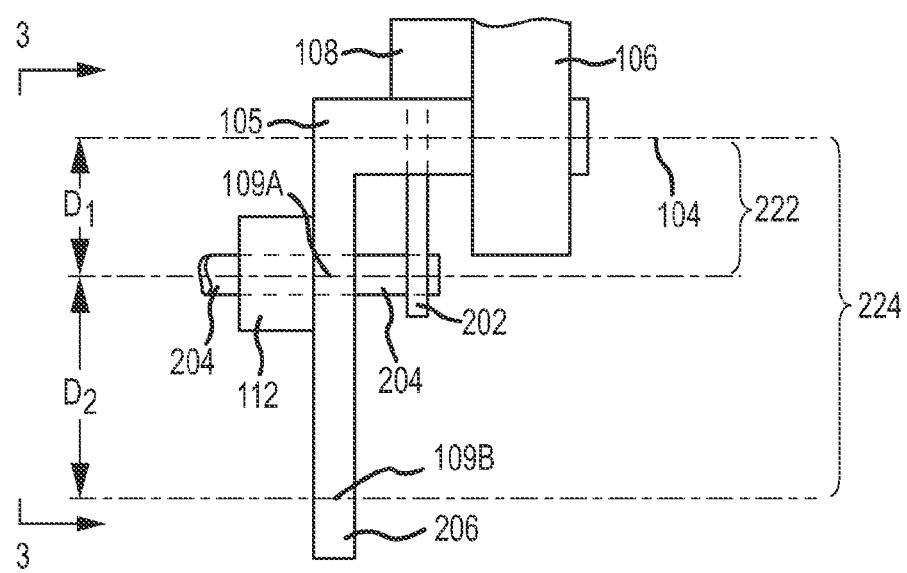
FIG. 2 is a front view of an exemplary flight control system with a variable position arm.

With reference now to FIG. 2, shaft 112 may be mechanically coupled to control surface 102 in any manner. A mechanical linkage system could be provided, for example, wherein shaft 112 from power actuator 110 (FIG. 1) delivers mechanical force (F) to bracket 105, which in turn rotates with respect to pivot point 104 and delivers the mechanical energy to linkage 106, which in turn displaces control surface 102 as desired. In the embodiment shown in FIG. 2, shaft 112 moves along an axis normal to the Figure. Shaft 112 is shown coupled to bracket 105 via a pin 204 that is able to slide within the slot 107 (FIG. 1) formed in the bellcrank 206 of bracket 105 which creates the moment arm. The various mechanical linkages 105, 106, 112, 204 may be formed of any material, such as steel or another metal, carbon composite, plastic, ceramic and/or any other material as desired for the particular embodiment.

As shown in the exemplary embodiment of FIG. 2, linear actuator 108 is shown coupled to the mechanical linkage 106 such that an actuator shaft 202 is able to connect to shaft 112, pin 204 and/or any other member to displace the coupling point of shaft 112 with respect to the pivot point 104. In the exemplary arrangement shown in FIG. 2, actuator shaft 202 moves upwardly or downwardly in the vertical direction. By extending shaft 202, for example, the coupling point (corresponding to point 109 in FIG. 1) can be displaced from a minimal arm point 109A to a maximal moment arm point 109B along bellcrank 206. Linear actuator 108 may be equivalently placed in any other location, for example at any point on bracket 105, linkage 106, and/or shaft 112.

Using conventional mechanical engineering principles, it can be readily shown that the moment produced about point 105 by force F applied along the long axis of shaft 112 (e.g. in a direction perpendicular to the plane of FIG. 2) in either direction would be given by the relationship "F·D", wherein "D" is the distance between the pivot point 104 and the coupling point (e.g. point 109 in FIG. 1, which is any point between points 109A and 109B in FIG. 2). By extending the shaft 202 such that coupling point of bellcrank 206 moves from the minimal moment point 109A to maximal moment point 109B, then, the moment produced about point 104 would increase from "F·D1" (corresponding to moment arm 222 in FIG. 2) to "F·(D1+D2)" (corresponding to moment arm 224 in FIG. 2). Stated another way, a larger moment can be produced from an equivalent force (F) by simply moving the coupling point on bellcrank 206 from the point 109A, which creates a moment arm of 222, to point 109B, which creates the larger moment arm 224. The larger moment resulting from moment arm 224, in turn, can be used to overcome the larger moments 115 (FIG. 1) that occur when control surface 102 becomes increasingly displaced from its neutral position.

Figure 3:
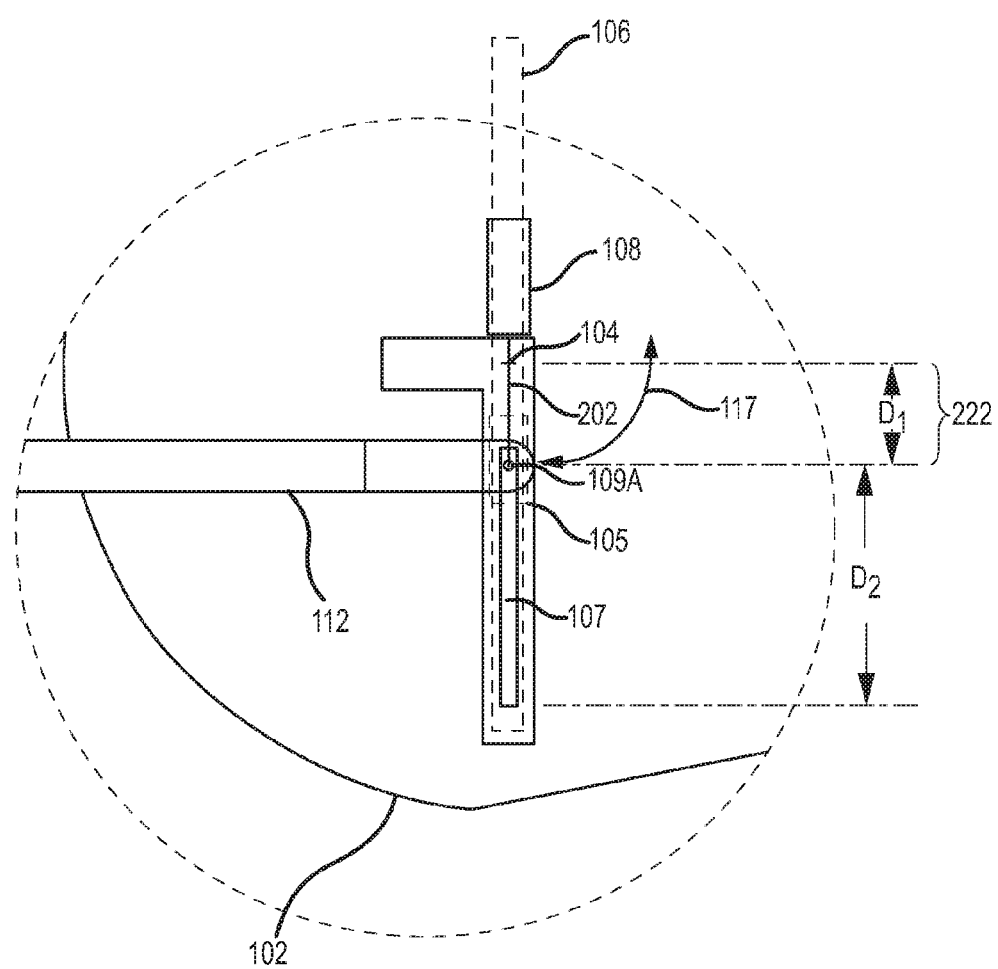
FIG. 3 is a side view of an exemplary flight control system with a variable position arm located in its minimal position to create the shortest moment arm and the smallest moments.
Figure 4:
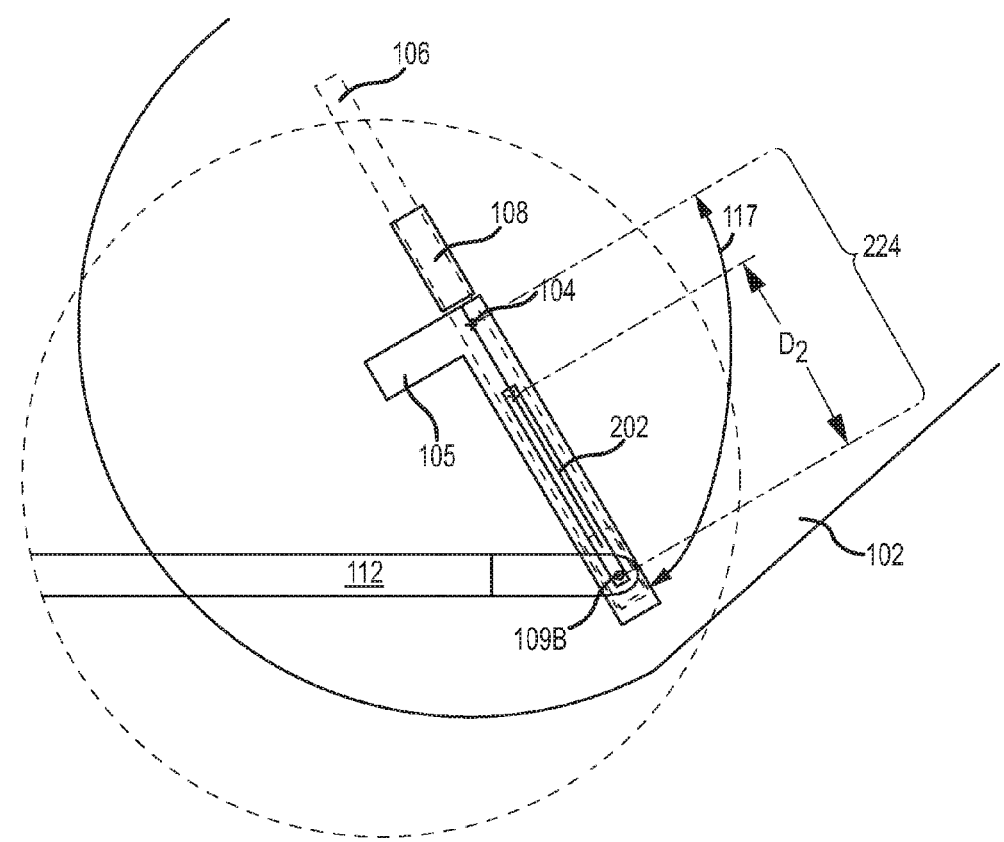
FIG. 4 is a side view of an exemplary flight control system with a variable position arm located in its maximum position to create the longest moment arm and the larger moments.

FIGS. 3 and 4, for example, show how moments 117 may be applied from points 109A and 109B, respectively. In the embodiment shown in FIG. 3, shaft 112 is coupled to bracket 105 at point 109A, which provides a relatively small moment arm 222 that results in a moment 117 proportional to distance D1 (i.e. the moment will be F·D1). This moment may be suitable for relatively low levels of control surface deflection, and may be a suitable starting point for deflection as described more fully below. As control surface 102 rotates with respect to pivot point 105, however, moments 115 (FIG. 1) become increasingly large. To overcome these larger moments 115, larger counter-moments 117 that are proportional to distance (D1+D2) can be provided by simply extending shaft 202 from linear actuator 108, as shown in FIG. 4. By moving the coupling point along slot 107 from point 109A to point 109B, a larger moment arm 224 is created, thereby increasing the torque produced about point 105 by force (F) applied by shaft 112. As noted above, other mechanical arrangements could be formulated to achieve equivalent results. For example, bracket 105 may be differently shaped (e.g. by leaving off an unused arm of the bell crank structure shown in the figures, thereby providing a simple elongated rigid member), and/or different linkage structures 106 could be provided.

As noted above, actuators 108 and/or 110 may be controlled in any manner. In various embodiments, actuators 108/110 respond to digital control signals formatted in any manner. Desired actuation may be encoded in pulse width modulated signals, for example, or in pulse density modulated signals whereby the number of digital pulses provided within a given time increases as the amount of desired actuation increases. In other embodiments, actuators 108/110 increase the amount of actuation in response to a received digital pulse, with actuation reduced or reset in response to a separately-transmitted pulse. Again, any encoding or modulating scheme could be used.

Figure 5:
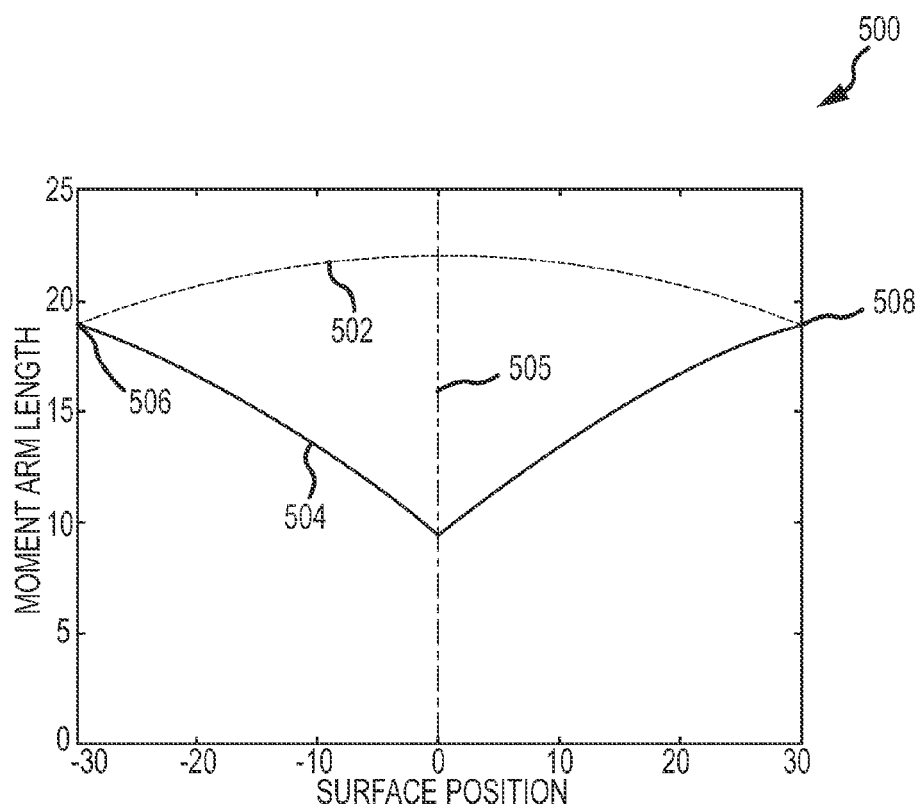
FIG. 5 is a plot showing variable and constant moment arm lengths for a variety of control surface deflection angles.

FIG. 5 shows an exemplary technique whereby the moment arm length (plotted on the vertical axis of plot 500) is controlled based upon the deflection of control surface 102 (plotted on the horizontal axis of plot 500) from a neutral position 505 toward points 506 and 508 of maximal displacement. Line 502 represents a conventional arrangement wherein the moment arm length remains relatively constant over the entire range of displacement, in contrast to the much shorter moment arm used for relatively low levels of displacement. As noted above, the length of the moment arm may vary from D1 to D1+D2 through proper control of linear actuator 108. This control, in turn, may be provided from signals 118 emanating from any sort of digital controller 114, which may programmed to implement any desired control technique. The control techniques shown by lines 502 and 504 in FIG. 5, for example, could be applied at different stages of flight, for example, to conserve power during takeoff, landing and/or level flight.

Figure 6:
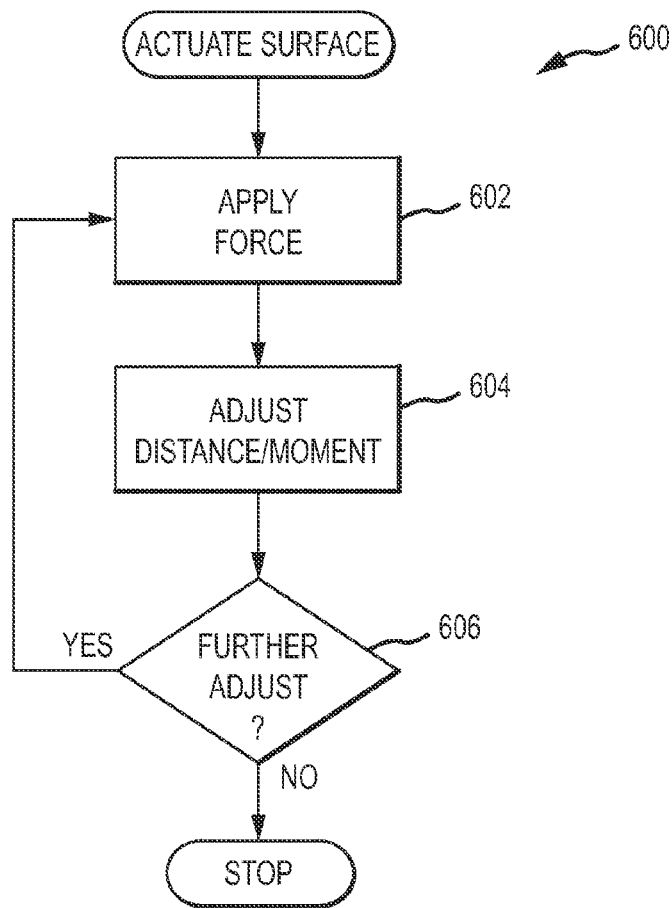
FIG. 6 is a flowchart showing an exemplary technique for actuating a surface that moves about a pivot point from a neutral position.

FIG. 6 is a flowchart showing an exemplary technique for actuating a surface 102 that moves about a pivot point 105 from a neutral position 505. Method 600 may be implemented using a digital controller (e.g. controller 114 in FIG. 1) in response to instructions provided by any sort of hardware, software, firmware and/or other logic as appropriate. In various embodiments, method 600 generally includes the broad step of applying a force (F) to a bracket 105 that is coupled to the surface 102 to thereby rotate the bracket with respect to the pivot point 104, wherein the force (F) is applied at a coupling point 109 on the bracket (step 602). This step may be performed by, for example, providing a control signal 116 from controller 114 to a power actuator 110 or the like. Signal 116 may include digital pulses such as those described above, and/or may be formatted in any other manner. While the surface is moving away from the neutral position 505, method 600 continues by adjusting the distance (D2) between the coupling point 109 and the pivot point 104, to thereby adjust the moment 117 produced about the pivot point 104, by the force (step 602). The moments produced for varying amounts of control surface 102 displacement may be varied and coordinated in any manner, including in the manner shown in FIG. 5. Further, the moment arms produced for any level of displacement may be adjusted in any manner, such as by actuating a linear actuator 108 to move the coupling point 109 between minimal and maximal moment-generating points 109A and 109B, as described more fully above. Linear actuator 108 may be controlled in any manner, such as by a providing a control signal 118 from controller 114 to actuator 108 as appropriate. In various embodiments, steps 602 and 604 may be practiced simultaneously to coordinate the movements of actuators 108 and 110, and/or steps 602 and 604 may be repeated (step 606) any number of times. Further embodiments may be enhanced or modified in any manner.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A system for actuating an aircraft flight control surface to rotate about a pivot point, the system comprising:
   a bracket having a moment arm coupled to the pivot point, the moment arm having a slot, the bracket being rotatable with respect to the pivot point to rotate the surface about the pivot point, the bracket coupled to the surface to thereby rotate the surface and the bracket;
   a first actuator having a shaft coupled to the bracket at a coupling point on the moment arm such that actuation force applied to the shaft results in a moment produced about the pivot point; and
   a second actuator configured to adjust the location of the coupling point with respect to the pivot point to thereby change the moment produced about the pivot point as the bracket rotates, said coupling point linearly slidable in the slot on said bracket with respect to said pivot point.

2. The system of claim 1 further comprising a controller configured to provide a control signal to the second actuator to thereby control the adjustment of the coupling point.

3. The system of claim 2 wherein the controller is configured to apply digital pulses as the control signal as the shaft of the first actuator becomes increasingly displaced from an initial position.

4. The system of claim 2 wherein the controller is further configured to apply an actuation control signal to the second actuator.

5. The system of claim 1 wherein the slot is configured to guide a pin coupled to the shaft of the first actuator.

6. The system of claim 5 wherein a minimal moment is applied about the pivot point when the pin is at a first end of the slot, and wherein a maximal moment is applied about the pivot point when the pin is at a second end of the slot opposite the first end.

7. The system of claim 1 wherein the bracket converts a linearly applied force from said shaft to rotational movement about said pivot point.

8. The system of claim 1 wherein the pivot point is coupled to the surface by a shaft coupled to the bracket.

9. The system of claim 8 wherein the second actuator is coupled to the shaft.

10. The system of claim 1 wherein the control surface is one of the group consisting of: a flap, an aileron, an elevator, a rudder, a stabilizer, an elevon, a flaperon, a slat and a tab.

11. A method of actuating a surface that rotates about a pivot point from a neutral position, the method comprising the steps of:
    applying a force to a bracket that is coupled to the surface to thereby rotate the bracket and surface about the pivot point, the force being applied at a coupling point in a slot on the bracket; and
    while the surface is moving away from the neutral position, adjusting the distance between the coupling point and the pivot point to thereby adjust the moment produced about the pivot point by the force; said coupling point linearly slidable in the slot in said bracket with respect to said pivot point.

12. The method of claim 11 wherein the adjusting step comprises increasing the distance between the coupling point and the pivot point to thereby increase the moment produced about the pivot point by the force, and then subsequently reducing the distance between the coupling point and the pivot point to thereby reduce the moment produced about the pivot point by the force.

13. The method of claim 11 wherein the distance between the coupling point and the pivot point is adjusted with a linear actuator.

14. The method of claim 11 wherein the applying step comprises providing an actuation-control signal from a controller to a first actuator.

15. The method of claim 14 wherein the adjusting step comprises providing a moment control signal from the controller to a second actuator.

16. The method of claim 15 further comprising the step of coordinating the actuation control signal and the moment control signal.

17. The method of control 15 wherein the moment control signal comprises a series of pulses provided to the second actuator during the adjusting step.

18. A flight control system for rotating a surface on the exterior of a vehicle with respect to a neutral position, the system comprising:
    a bracket, having a slot, coupled to the surface and rotatable with respect to a pivot point to thereby rotate the surface and the bracket about the pivot point, the bracket creating a variable moment arm;
    a power actuator having a shaft coupled to the bracket at a coupling point on the moment arm such that actuation force applied to the shaft results in a moment produced about the pivot point;
    a linear actuator configured to adjust the location of the coupling point with respect to the pivot point to thereby change the moment produced about the pivot point as the bracket rotates, said coupling point linearly slidable in the slot by said linear actuator on said bracket with respect to said pivot point; and
    a digital controller electronically coupled to drive the linear actuator, the digital controller is configured to increase the distance between the pivot point and the coupling point as the surface moves away from the neutral position and to decrease the distance between the pivot point and the coupling point as the surface moves toward the neutral position.

19. The system of claim 18 wherein the slot is configured to guide a pin coupled to the shaft of the power actuator.

20. The system of claim 19 wherein the linear actuator comprises a linear actuator shaft that is coupled to the pin and that is configured to extend and retract to thereby adjust the location of the coupling point along the varying moment arm.

* * * * *